March 1, 1927.  W. HYLARIDES  1,619,299
ANIMAL FORCEPS
Filed June 14, 1926
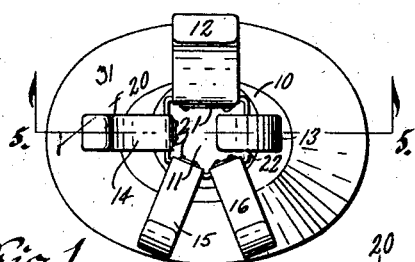
Fig. 1.
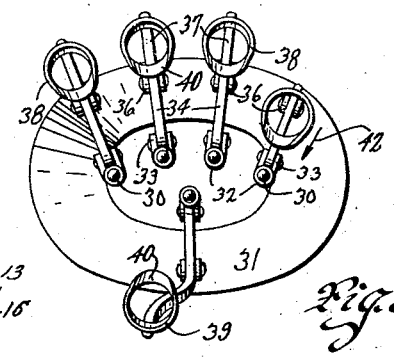
Fig. 3.
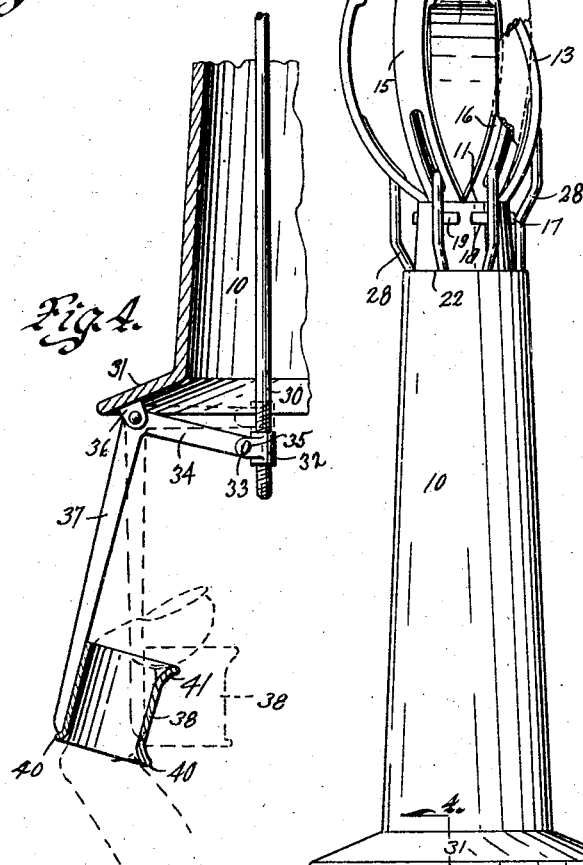
Fig. 4.
Fig. 2.
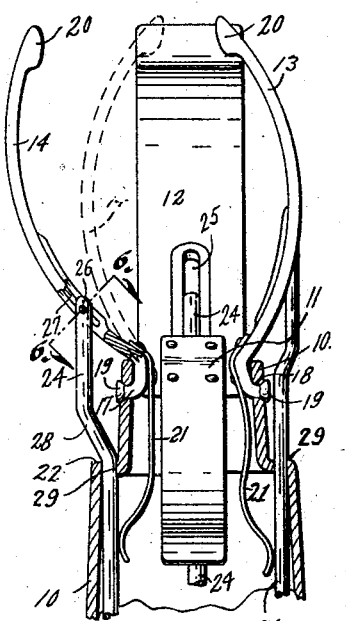
Fig. 5.
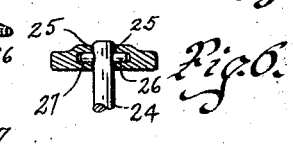
Fig. 6.
Witness
Ray Kushey
Inventor
Walter Hylarides
by Baird & Freeman Attorneys Patented Mar. 1, 1927.

1,619,299

UNITED STATES PATENT OFFICE.

WALTER HYLARIDES, OF GRANVILLE, IOWA.

ANIMAL FORCEPS.

Application filed June 14, 1926. Serial No. 115,888.

The object of my invention is to provide an animal forceps of simple, durable and comparatively inexpensive construction.

A further object is to provide a device of this kind having a plurality of fingers which may be opened or closed as desired, each one of which is selectively manipulated.

Still a further object is to provide an animal forceps with a convenient means for operating each individual finger, said means being adjustably arranged to suit the hand of the user.

A further object is to provide novel features of construction for such a device whereby the fingers are held in open position.

With these and other objects in view, my invention consists in the construction, arrangement and combination of the various parts of my device, whereby the objects contemplated are attained as hereinafter more fully set forth, pointed out in my claims and illustrated in the accompanying drawings, in which:

Figure 1 is a plan view of an animal forceps embodying my invention.

Figure 2 is a side elevation of the same.

Figure 3 is a bottom view of my forceps illustrating the operating thimbles.

Figure 4 is an enlarged detail sectional view taken on the line 4—4 of Figure 2.

Figure 5 is an enlarged detail sectional view taken on the line 5—5 of Figure 1; and Figure 6 is an enlarged detail sectional view taken on the line 6—6 of Figure 5.

Upon the accompanying drawing, I have used the reference numeral 10 to indicate generally a tubular casing upon which the parts of my invention are mounted.

The casing 10 has an open upper end 11 from which protrude a plurality of fingers, 12, 13, 14, 15, and 16. The end 11 and the fingers just referred to are adapted to be inserted into the uterus of a pig or other animal for the removal of the animal's offspring.

The lower ends of the fingers extend into the casing 10 and each has an out-turned portion 17 which coacts with a slot 18 in the casing 10 whereby the fingers are pivoted in the slots 18. The ends 17 are riveted as at 19 for retaining them in the slots 18. The upper ends of the fingers have knobs 20 for engaging the offspring and are well rounded on all sides to prevent injury to the animal.

For normally holding the fingers in open position, I provide a leaf spring 21 secured to each of the fingers 12, 13, 14, 15, and 16 as clearly shown in Figures 1 and 6.

It will be noted that the springs 17 are within the casing 10 whereby they are concealed and are not in the way in using my instrument. The springs 17 resiliently hold the fingers in open position, as the fingers 12, 14, 15, and 16 are illustrated on the drawing.

For operating each finger toward closing position as is illustrated by the finger 13 in Figure 2 of the drawing, I provide a rod 24. Each rod 24 has its upper end extending into a slot 25 in its respective finger. A pin 26 projects in opposite directions from the rod 24 into slots 27. The slots 27 open into the slot 25 as clearly illustrated in Figure 6 of the drawing. The rod 24 extends down to the casing 10 and is bent as at 28 to extend through a hole 29 in the wall of the tubular casing 10. From the construction of the parts just described it will be seen that the rods 24 are normally in the position of those which operate the fingers 12, 14, 15, and 16 in Figure 2.

When the rods 24 are moved upward as illustrated by the one which operates the finger 13, its respective finger will be moved toward closed position. The lower end of the rod 24 is threaded as at 30 and terminates just below a conical flange 31 which is formed on the lower end of the tubular casing 10.

A nut 32 is screwed onto the threaded end 30 of the rod 24 and has ears 33 formed thereon. A lever 34 is pivotally secured between the ears 33 by a cotter or pin 35. The lever 34 is pivoted between ears 36 which is secured adjacent the outer edge of the washer 31. The conical shape of the flange 31 allows considerable pivotal movement of the lever 34. The lever 34 has a downwardly extending portion 37 to the lower end of which is secured a tubular member 38 which is similar to a thimble with the exception that it doesn't have a closed end.

It will be noted by referring to Figure 3 that there are five levers 34, to four of which are secured the thimbles 38 and to the remaining one is secured a similar thimble 39. The thimbles 38 and 39 are rounded as at 40 and have an inwardly projecting flange 41 on their upper ends.

The thimbles 40 are adapted to receive the fingers of the hand of the operator as illustrated in dotted lines in Figure 4 and the thimble 39 is adapted to receive his thumb.

In the use of my device the fingers 12, 13, 14, 15 and 16 are normally held open by the springs and the fingers and thumb of the operator are placed in their proper thimbles. When it is desired to close any of the fingers 12, 13, 14, 15 or 16, the proper thimble is drawn toward the center as shown by the arrow 42 in Figure 3. Then if the entire hand is closed by a fist closing movement all the fingers 12, 13, 14, 15 and 16 are moved toward closing position.

It will thus be seen that I have provided an animal forceps having a plurality of fingers, each of which is conveniently operated without interfering with the position of the remaining fingers.

The cotter pin 35 can be removed and the nut 32 adjusted to any desired position after which the pin 35 can be replaced. Thus, my device may be adapted to an operator having any particular size of hand. The arrangement of the lower end of my device gives the operator a lever action whereby greater force may be applied to the fingers 12, 13, 14, 15, and 16 without undue effort on the part of the operator. By making the thimbles 38 and 39 open, the fingers may extend therethrough so that my forceps may be supported and operated and can be either inserted or withdrawn with one hand.

Some changes may be made in the construction and arrangement of the various parts of my animal forceps without departing from the real spirit and purpose of my invention and it is my intention to cover by my claims, any modified forms of structure or use of mechanical equivalents, which may be reasonably included within their scope.

I claim as my invention:

1. An animal forceps of the class described comprising a tubular casing, fingers mounted on one end thereof, having spring means for normally constraining said fingers toward open position, and means mounted on the other end thereof for selectively closing said fingers.

2. An animal forceps of the class described comprising a tubular casing, fingers mounted on one end thereof, and means pivotally mounted on the other end thereof for selectively operating said fingers, said last means comprising thimbles adjustably connected to said fingers.

3. An animal forceps of the class described comprising a tubular casing, fingers pivoted at one end thereof, and spring actuated toward open position, a flange at the other end thereof, rods slidably mounted through said casing, levers pivoted to said flange and to the ends of said rods, said rods extending through slots in said tubular casing and connected to said pivoted fingers whereby movement of said levers toward the axis line of said casing will cause said fingers to close.

4. An animal forceps of the class described comprising a tubular casing, fingers pivoted at one end thereof, and spring actuated toward open position, rods slidably mounted through said casing, and levers pivoted to the lower end thereof and to the ends of said rods, said rods extending through slots in said tubular casing and connected to said pivoted fingers whereby movement of said levers toward the axis line of said casing will cause said fingers to close, and thimbles mounted on the ends of said levers adapted to receive the fingers and thumb of an operator.

Des Moines, Iowa, May 28, 1926.

WALTER HYLARIDES.